Oct. 8, 1957  A. H. RENFROW  2,808,614
MEAT-MOLDING MACHINE
Filed April 30, 1956
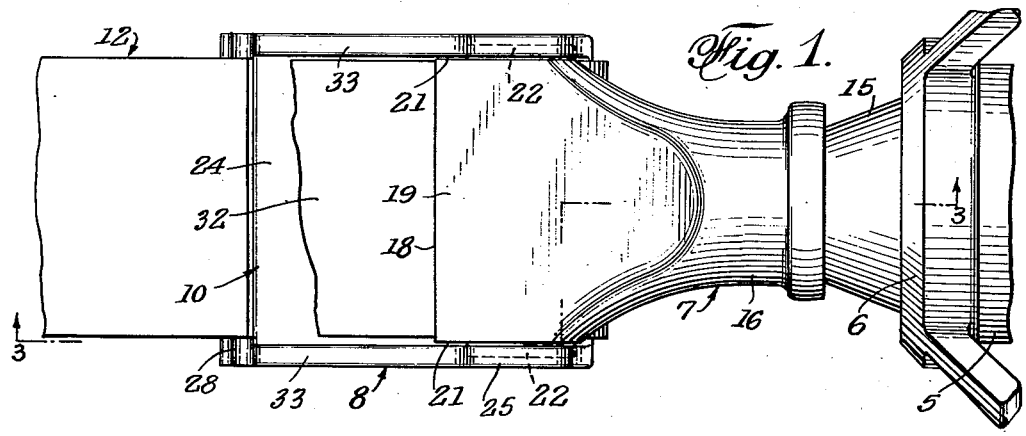
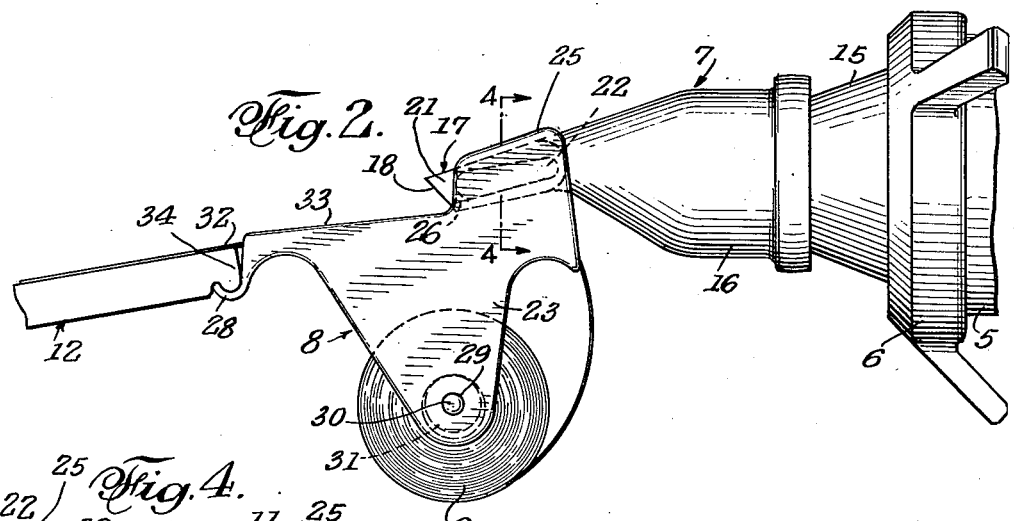
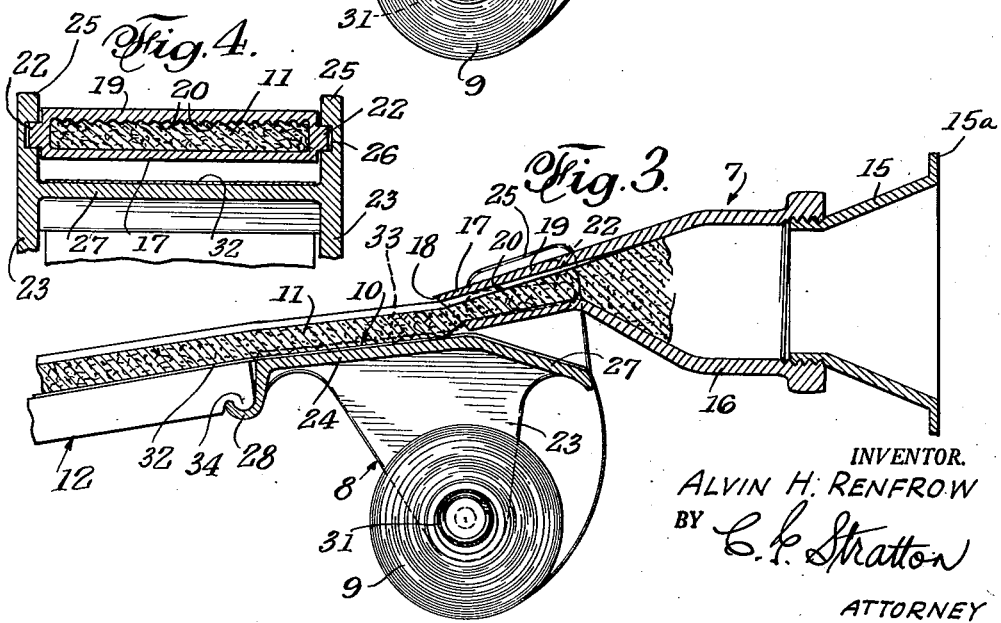
INVENTOR.
ALVIN H. RENFROW
BY C. P. Stratton
ATTORNEY

United States Patent Office 2,808,614
Patented Oct. 8, 1957

2,808,614

MEAT-MOLDING MACHINE

Alvin H. Renfrow, La Canada, Calif.

Application April 30, 1956, Serial No. 581,510

2 Claims. (Cl. 17—32)

This invention relates to a machine for molding ground meat into the form of a continuous ribbon, the invention more particularly dealing with an attachment for meat grinders that molds the ground product for such grinders.

An object of the invention is to provide a meat-molding attachment for grinders that, by forming the meat that is discharged by the grinder into a flat ribbon-like form, enables the ready division of the ribbon of meat in portion-sized units that have improved salability over ordinary ground meat.

Another object of the invention is to provide a device of the character referred to that forms the ribbon on a self-feeding strip of paper to, thereby, provide improved handle-ability of the meat product.

A further object of the invention is to provide a machine of the character indicated that is readily separated into easily cleaned components without the need for tools and thereby enabling time-saving maintenance of the machine.

A yet further object of the invention is to form the machine components into easily cast units that more readily lend themselves to thorough cleaning.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangement of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a top plan view of a meat-molding machine according to the present invention.

Fig. 2 is a side elevational view thereof.

Fig. 3 is a longitudinal sectional view as taken on the line 3—3 of Fig. 1.

Fig. 4 is an enlarged cross-sectional view as taken on line 4—4 of Fig. 2.

The drawing shows the outlet 5 of a meat grinder of generally conventional design, it being understood that the usual orifice plate is disposed across the opening of said outlet and through which ground meat is discharged. The present machine is shown as an attachment to said grinder, the same being separably connected to the outlet 5 as by a nut 6.

The meat-molding machine that is illustrated comprises, generally, a ground meat receiving and molding head 7, a carrier 8 for a roll of paper 9 separably connected to the head 7 and embodying a guide 10 along which the ribbon of meat 11 that is discharged by the head 7 moves, and an elongated slide support 12 forming a continuation of the guide 10 and constituting a support for the molded ribbon from which portion-sized units may be severed from said ribbon.

The head 7 is preferably made of two threadedly connected cast parts of which the round-sectioned part 15 is connected to the grinder outlet 5 by means of the nut 6, and the part 16 forms an extension of part 15 that changes from a round-sectioned end, where connected to part 15, to flattened ribbon forming end 17.

In practice, part 15 is provided with a flange 15a that is caught behind nut 6 and enables rotational adjustment of the head 7 so the same may be arranged properly upright. Said part 15 is formed to be conical and of a size, at its flanged end, to conform to the size of the outlet 5. Thus, by suitable selection of part 15, the head may be fitted to meat grinders of different outlet size.

The part 16 threadedly connects to the smaller end of the conical part 15, is tubular at the end having said connection, and is gradually widened and flattened to have the nozzle form of end 17. The outlet 18 of said end 17, as best indicated in Fig. 4, is generally rectangular. Therefore, the ground meat discharged by the grinder outlet 5 first has the conical form imparted thereto by part 15, is then cylindrical during its passage through adjacent end of part 16, and, finally, is molded into ribbon form, shown at 11, by the nozzle end 17 of part 16. This ribbon of meat is discharged from outlet 18 in a continuous manner according to the output of the meat grinder to which the machine is attached.

From Figs. 3 and 4 it will be seen that the inner face of the upper wall 19 of the flattened nozzle 17 is grooved to define a set of longitudinal ribs or lands 20 that form corresponding grooves in the upper face of the ribbon of meat as the same moves outwardly from the head 7.

As best seen in Figs. 1, 2 and 4, the opposite side faces 21 of the nozzle 17 are generally flat and parallel, and the same are provided with integral wedge-shaped keys 22 that are tapered to be wider or thicker at their ends adjacent to the nozzle outlet 18 and thinner at their opposite ends.

The carrier 8 is shown as a cast member provided with sides 23 that are integrally connected by a cross wall 24 that constitutes the guide 10. Said sides 23 have extensions 25 above wall 24 and the same are provided with open slots or recesses 26 that are shaped according to the wedge shape of keys 22. It will be clear therefore, that by entering said keys into said recesses and drawing the carrier 8 forward to achieve tight wedging of the keys in the recesses, the carrier is firmly yet removably connected to the head 7.

The wall 24 is disposed parallel and in close proximity to the nozzle outlet 18 and extends forwardly so as to receive and form a guide or slide for the ribbon of meat exiting from said outlet. Beneath the nozzle 17, said wall 24 has an angularly downward and rearward disposition as shown at 27 of Fig. 3. At its forward end, said wall 24 terminates in a transverse upwardly facing hook 28.

The sides 23 have aligned apertures 29 that are receptive of the trunnion ends 30 of a telescopic roll-supporting bar 31. The latter is not detailed since the same may follow the usual forms of toilet tissue support bars. In any case, said bar and the walls are normally engaged to support roll 9 and may be separated to remove said roll by telescopic foreshortening that retracts the trunnions 30 from the apertures 29.

The roll 9, of paper or the like, provides a web 32 that is drawn over angular wall 27 and longitudinally along the guide wall 24. Said web is guided between extensions 25 and shallower forwardly directed ledges 33.

Thus, the web 32 is in position to receive the ribbon of meat 11 and, as said ribbon is being fed forwardly, said web slides along the guide wall 24 and roll 9 pays out accordingly.

The support 12 may advantageously comprise a length of wood or the like that has one end 34 in hooking engagement with hook 28 and its other end supported in any desired manner so as to dispose the board at an angle approximating that of the wall 24. Some change in said angle would not ordinarily affect the feed of the meat ribbon therealong.

Since the web-supported ribbon moves longitudinally along support 12, it is a simple matter, at any time that the feed is stopped to cut through both the ribbon and the web, at suitably spaced intervals, to produce portion-sized units or patties of rectangular form. The appeal to the eye and the ease with which such patties are achieved are evident from the foregoing.

The complete absence of bolts, nuts, screws and other such fasteners will be noted.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

I claim:

1. In a meat-molding machine, a head having a passage for meat and formed to have a generally tubular inlet part and a flattened outlet part that is wider than the tubular part, said flattened part having parallel side faces that are spaced transversely a distance greater than the transverse size of the tubular part, a lateral wedge-shaped projection extending from each said face and each said projection having an end adjacent to the discharge of the outlet part that is wider than the opposite end thereof; a carrier member having a meat-receiving wall beneath and forward of the outlet end of the outlet part and rearwardly disposed and upwardly directed side extensions on the carrier and spaced to loosely accommodate the flattened head part therebetween, each side extension being formed to have an inner side recess and each said recess having a shape conforming to the shape of the lateral projections, whereby, during assembly of the head and the carrier member, the upwardly directed extensions of the latter are first placed in alignment with and rearward of the lateral projections and, then, upon forward movement of the carrier member, the recesses of the extensions are engaged with the respective lateral projections and the mentioned wider portions of the latter both limit the forward position of the carrier member and wedgingly hold the same in fixed relation to the head.

2. In a meat-molding machine according to claim 1, the lateral extensions having their wider ends terminating rearwardly of the forward ends of the side faces on the head and, therefore, rearwardly of the discharge of the outlet part, and the forward end of the side extensions of the carrier member terminating at their forward ends in approximate alignment with the wider ends of the wedge-shaped extensions, whereby the discharge of the head is disposed forwardly of the forward edges of the side extensions.

References Cited in the file of this patent
UNITED STATES PATENTS

| | | |
|---|---|---|
| 716,713 | Hughes | Dec. 23, 1902 |
| 769,454 | Ankers | Sept. 6, 1904 |
| 881,511 | Waters | Mar. 10, 1908 |
| 2,057,611 | Fischer | Oct. 13, 1936 |
| 2,694,222 | Spang | Nov. 16, 1954 |
| 2,752,629 | Shadid | July 3, 1956 |